(12) United States Patent
Carpentier et al.

(10) Patent No.: US 7,530,115 B2
(45) Date of Patent: May 5, 2009

(54) ACCESS TO CONTENT ADDRESSABLE DATA OVER A NETWORK

(75) Inventors: Paul R. Carpentier, Boechout (BE); Jan F. Van Riel, Geel (BE); Tom Teugels, Schoten (BE)

(73) Assignee: EMC Corporation, Hopkinton, MA (US)

( * ) Notice: Subject to any disclaimer, the term of this patent is extended or adjusted under 35 U.S.C. 154(b) by 601 days.

(21) Appl. No.: 11/210,477

(22) Filed: Aug. 24, 2005

(65) Prior Publication Data

US 2005/0283496 A1 Dec. 22, 2005

Related U.S. Application Data

(63) Continuation of application No. 11/197,854, filed on Aug. 5, 2005, which is a continuation of application No. 11/196,928, filed on Aug. 4, 2005, which is a continuation of application No. 10/673,356, filed on Sep. 26, 2003, which is a continuation of application No. 09/236,366, filed on Jan. 21, 1999, now Pat. No. 6,807,632.

(60) Provisional application No. 60/072,316, filed on Jan. 23, 1998.

(51) Int. Cl.
*H04K 21/00* (2006.01)

(52) U.S. Cl. .............................. 726/30; 726/4; 713/165; 713/190; 705/2; 705/51; 711/108; 711/216

(58) Field of Classification Search .................... 726/30, 726/4; 713/165, 190; 705/2, 51; 711/108, 711/216

See application file for complete search history.

(56) References Cited

U.S. PATENT DOCUMENTS 5,829,046 A * 10/1998 Tzelnic et al. .............. 711/162
5,978,791 A * 11/1999 Farber et al. .................. 707/2

* cited by examiner

*Primary Examiner*—Matthew Smithers
*Assistant Examiner*—Paul Callahan
(74) *Attorney, Agent, or Firm*—Krishnendu Gupta; Penelope S. Wilson

(57) ABSTRACT

Access to content addressable data on a network is facilitated using digital information storing devices or data repositories ("silos") that monitor broadcast data requests over the network. A number of silos automatically monitor both data requests and data itself that are broadcast over a network. The silos selectively store data. Each silo responds to data requests broadcast over the network with data the silo has previously intercepted. A content addressable file scheme is used to enable the data repositories to reliably identify data being requested. When a data request is received, each silo evaluates whether it has all or a portion of the data being requested and responds to requests when it has the data. Requests for data are implemented by broadcasting a cryptographic hash data identifier of the data file needed. The data identifier is used by a silo to determine which data to receive and store.

57 Claims, 9 Drawing Sheets

```
<folder name="XXXXX" timestamp="1969.12.31 03:59:59">
  <folder name="XXXXX" timestamp="1997.11.21 11:57:06">
    <file name="AAAAA.AAA" timestamp="1997.11.24 02:39:28" size="139" md5="5PI5TTAMKVVJGx5Q34QGFBLOOVD"/>
    <file name="BBBBB.BBB" timestamp="1997.11.24 02:36:26" size="143" md5="DL2N74C6RNUJMx61LM9S70T7MCT"/>
    <file name="antenna.bat" timestamp="1997.11.05 10:38:10" size="252" md5="04MF5QS17GLH7xAUGQMOMOG3KBU"/>
  <end folder>
<end folder>
```

Descriptor File

FIG. 5

ACCESS TO CONTENT ADDRESSABLE DATA OVER A NETWORK

CROSS-REFERENCE TO RELATED APPLICATIONS

This application is a continuation of U.S. patent application Ser. No. 11/197,854, filed on Aug. 5, 2005, which is a continuation of U.S. patent application Ser. No. 11/196,928, filed on Aug. 4, 2005, which is a continuation of U.S. patent application Ser. No. 10/673,356, filed Sep. 26, 2003, which is a continuation of U.S. patent application Ser. No. 09/236,366, now U.S. Pat. No. 6,807,632, filed Jan. 21, 1999, which claims the benefit of U.S. Provisional Patent Application No. 60/072,316, filed Jan. 23, 1998. U.S. patent application Ser. No. 11/197,854 is also a continuation of U.S. patent application Ser. No. 10/673,356, filed Sep. 26, 2003, which is a continuation of U.S. patent application Ser. No. 09/236,366, now U.S. Pat. No. 6,807,632, filed Jan. 21, 1999, which claims the benefit of U.S. Provisional Patent Application No. 60/072,316, filed Jan. 23, 1998.

This application is also a continuation of U.S. patent application Ser. No. 10/673,356, filed Sep. 26, 2003, which is a continuation of U.S. patent application Ser. No. 09/236,366, now U.S. Pat. No. 6,807,632, filed Jan. 21, 1999, which claims the benefit of U.S. Provisional Patent Application No. 60/072,316, filed Jan. 23, 1998.

Each of the above-referenced applications and patents is incorporated herein by reference in its entirety.

BACKGROUND OF THE INVENTION

1. Field of the Invention

The present invention relates generally to methods and apparatuses for facilitating access to content addressable data over a network. More specifically, digital information storing devices monitor broadcast data requests and in return broadcast requested data over the network.

2. Description of the Related Art

In a typical network arrangement, files are requested by a client machine from a server. Most internets or intranets operate according to a client/server model or similar scheme. Clients typically must first know where a desired file may be found before sending a request to a server that can provide the desired data. Since clients must know the name and location of files in a client/server environment, problems may result when the name or location changes or if different data is stored under the same name. Another shortcoming of such a scheme is that the client must either know where the data may be found or be able to somehow search for the data and find where the data is. This problem is ubiquitous among a variety of computers such as desktops and workstations, among various operating systems including DOS, Windows and UNIX, and among networks such as LANs and WANs. The problem also extends to other digital assets which are not stored as files, assets such as video clips, sections of images, database records and the like which are created and managed as entities but are never stored as unique files. Finding, tracking, and retrieving digital assets is made more complex and more fragile when references to locations are needed.

In some cases, data may be available from more than one source. Even if the client does know where the data may be found, it is typically not possible for the client to determine which potential source of data is the best source of all potential available sources. Given these shortcomings, it would be desirable if a data access scheme could be created where clients could simply send out a broadcast request for data over a network and the best source of data on the network would automatically answer the request. Such a system could eliminate the need to search for a server to provide data since the data request itself would be used to determine the data source used to fulfil the request.

Another aspect of the conventional client/server environment is that data must somehow be selected and placed on a server and made available to clients. It would be desirable if data that is likely to be needed by a number of clients could be automatically identified and stored in a place where it could efficiently be made available to clients.

In a growing network environment where client machines are constantly being added to the network, an individual server may become overwhelmed by data requests to the point where it is unable to provide satisfactory response times. In a conventional client/server environment, additional servers are added and clients are removed from existing servers and assigned to the additional servers to relieve the load on the existing servers. In such an environment, numerous schemes have been devised to apportion client connections among a group of servers. These schemes have achieved some level of success at load balancing. It would be useful if a system could be devised where different servers could service the same client so that individual client requests for data could be filled by more than one server depending on the most efficient way to transfer data to the client.

In view of the foregoing, a technique is desirable that would allow data sources to automatically identify data to be stored, and would allow data sources to transmit data to users without requiring the user to search for or otherwise identify a specific source on the network for the data. It would be desirable if such transmission of data to users could occur in response to a general user request broadcast over a network. It would be further desirable if, in certain circumstances, clients could respond to data requests made over a network without creating data conflicts or unduly interrupting local client processes.

SUMMARY OF THE INVENTION

Accordingly, a system and method for improving access to data over a network is disclosed. A number of data repositories referred to as "silos" automatically monitor both data requests and data itself that are broadcast over a network. The silos selectively store data. Each silo can respond to data requests broadcast over the network with whatever data the silo has previously intercepted. When a data request is received, each silo evaluates whether it has all or a portion of the data being requested and responds to requests when it has the data.

Data comes in numerous forms including fragments of binary data (representing records or objects), larger database records or multimedia objects (video or audio clips, digital images, etc.), and files representing everything from simple text to complex databases. Applications and users increasingly interact with data at various levels of complexity and these individual assets are all important and useful. The present system treats any binary sequence as a valid datum and refers to it as a digital asset or simply as an asset. Assets may or may not have ever been stored as or in a file. The asset is treated in such a way that the present invention is enabled to accept an asset and return an asset in a binary form to its human, application, or network device users.

Silos first monitor asset requests sent over the network. These requests include an asset content identifier computed from the contents (binary sequence) of each asset for each asset requested. Preferably, an asset content identifier is computed by taking a cryptographic hash of the asset contents. A silo then adds the asset content identifier of the requested asset to a list of assets that the silo would like to obtain. The silo then obtains these assets from the network either by receiving a broadcast of the asset when it is transmitted by another network device, or by requesting or importing the asset using an importer (software which actively requests copies of assets) running on the silo.

Using this scheme, data is stored and made available to clients on the network without requiring all clients to access a particular server that has the data. It is not required that data be selected and stored on a particular server. Nor is it required that the address of a particular server be made known. Instead, silos on the network monitor data sent across the network and determine which data should be stored, thus making the data readily available to clients on the network. The scheme described provides a true serverless network with distributed data storage. Because unique asset content identifiers are used, an asset may be obtained from any location and the integrity of the contents may be reliably verified by recomputing the asset hash and comparing it to a stored asset content identifier in the silo.

BRIEF DESCRIPTION OF THE DRAWINGS

The present invention will be readily understood by the following detailed description in conjunction with the accompanying drawings in which:

FIG. 5 is a diagram illustrating the structure of a descriptor file.

DETAILED DESCRIPTION OF INVENTION

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alterative, modifications, and equivalents as may be included within the spirit and scope of the invention as defined by the appended claims. For example, for ease of understanding, many of the figures illustrate use of the invention with traditional computer files. As described herein, however, the present invention is suitable for use with any digital asset or binary sequence.

In the following description, numerous specific details are set forth in order to provide a thorough understanding of the present invention. The present invention may be practiced without some or all of these specific details. In other instances, well known process operations have not been described in detail in order not to unnecessarily obscure the present invention.

Overview

Figure 1:
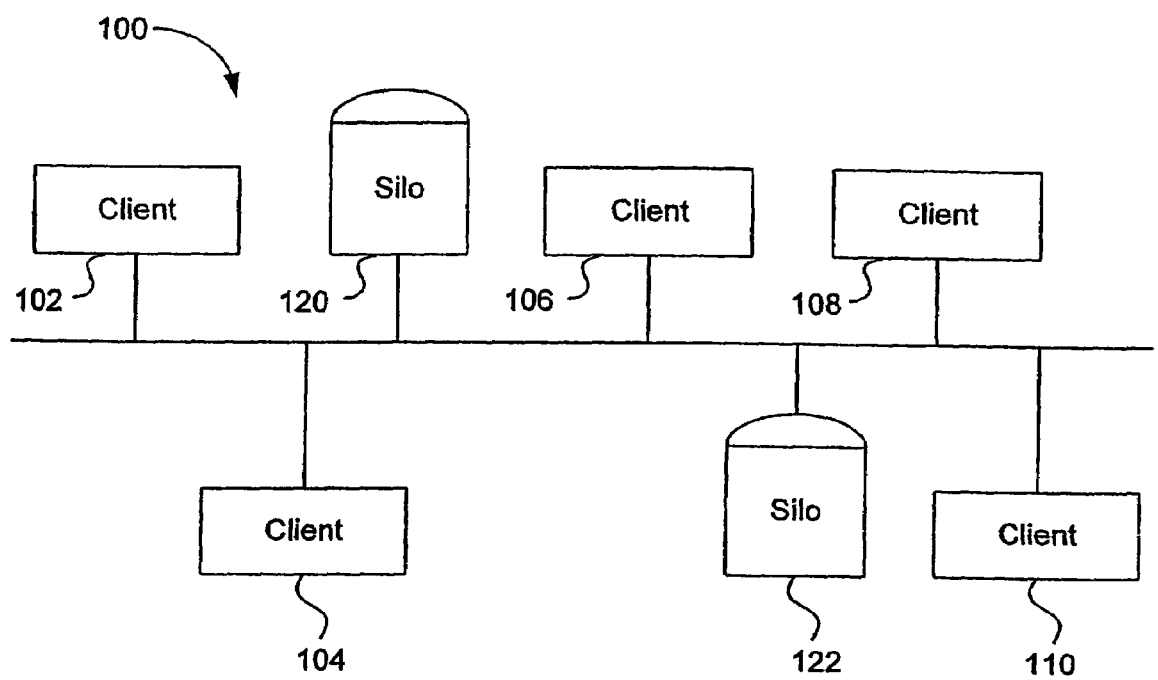
FIG. 1 is a block diagram illustrating a network that includes any number of clients and any number of data repositories or silos.

FIG. 1 is a block diagram illustrating a network 100 that includes any number of clients 102-110. The term "client" is used here in the sense of a client being a requester of information from the network. It should be recognized that any network device may simultaneously function as both a client and a server in that the device can provide information and also can request and receive information. As used herein, the term "client" is used to describe a device that happens to be requesting information at a given time; the term "server" is used to describe a device that happens to be providing information at a given time.

The architecture shown in FIG. 1 is an architecture without a traditional server. Instead of a server dedicated to receiving and fulfilling client requests for information that are directed specifically to the server's address by clients (as in the prior art), network 100 includes data repositories silo 120 and silo 122. A silo may generally be configured as a standard client machine. For example, a silo may be implemented on a user's workstation, on a shared asset or print server system, on an application server, or on a system provisioned specifically to provide this capability.

Silos 120 and 122 monitor broadcast or "multicast" requests for information on the network and selectively store information that is requested according to one of the schemes detailed below. A "multicast" transmission is a transmission from a peer that is addressed to all peers available on the network. Similarly, a multicast request is a request sent to all peers available on the network. Peers include any device included in a defined multicast group, a selected group distinguished by specific network or software filter settings; a multicast group may include any device accessible over a data link It should be noted that the term broadcast as used herein includes a multicast.

The silos also respond to certain information requests when they determine that the information is stored on the silo. As is detailed below, new silos may be added to the network to provide additional information storage and retrieval in either a serial or parallel manner. That is, silos may be added that store information that is not stored by other silos or silos may be added that store the same information as other silos. Each silo is configurable to share the burden of responding to information requests.

Figure 2:
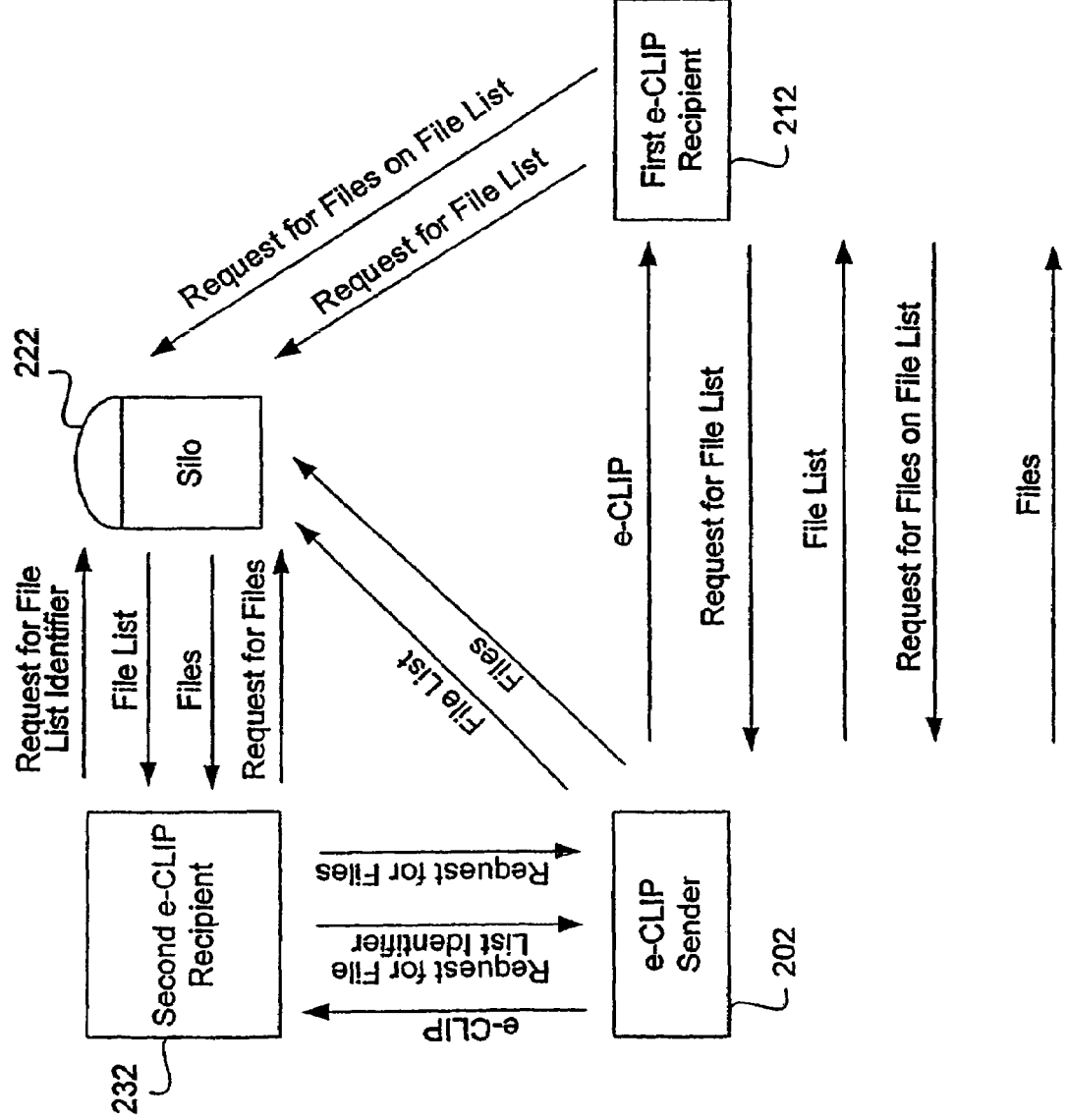
FIG. 2 is a block diagram illustrating interaction between an information sender, a silo, and two information recipients on a network.

FIG. 2 is a block diagram illustrating how a silo 222 is used to store information and to transfer information in an efficient manner when assets are sent from e-CLIP sender 202 to two recipients 212 and 232. In the example shown, the asset sender sends the assets using an e-CLIP™. An e-CLIP is a reproducible, reliably unique identifier for a collection of digital information. In one embodiment, an e-CLIP is a numerical reference. An e-CLIP may represent an asset, a group of assets, a group of asset identifiers, or other collections of data or database information. In a particular embodiment, an e-CLIP may be implemented as is described in U.S. patent application Ser. No. 09/236,366 and in U.S. provisional patent application No. 60/072,316, both of which are incorporated by reference above. When representing a single asset, an e-CLIP includes an asset content identifier that is generated by applying a cryptographic hash function to the contents of the asset.

An e-CLIP may also represent any number of assets. It should be noted that an e-CLIP may also include a flag that marks whether it identifies an asset list or only a single asset. When an e-CLIP represent multiple assets, a cryptographic hash function is applied to the contents of each of the assets to produce an asset content identifier for each asset. Once the asset content identifier for each of the selected assets is generated, it is included in an asset list along with other relevant information in a descriptor file. An example of a descriptor file is shown in FIG. 5. The other asset information included with the descriptor file may include directory information about where the files are located, file names, file sizes, time and date stamps for each file included, ownership of such files, and other meta data, as is described below. The descriptor file may contain similar descriptions of binary assets which were not originally files and which may not be used to create unique files. Such assets represent binary sequences which are records, elements, or clips of larger sequences or collections. These assets are treated in a manner similar to files and are returned to their user for processing through appropriately designed binary interfaces.

The descriptor file may also include data about the context or implications of the file list, the purposes for which the file list is being created, or any other information.

The descriptor file is then stored in a digital file in a suitable form for the type of computer system or other environment in which the descriptor file resides. A cryptographic hash file identifier (asset content identifier) for the stored descriptor file is then computed which, in one embodiments becomes the e-CLIP by which the collected files may be referenced, found, and verified. It should be recognized that the e-CLIP that identifies the collection of files may be produced by the same algorithm used to compute the asset content identifiers for the individual assets named and listed within the descriptor file. In other embodiments, the asset identifier computed from the descriptor file is combined with other information (such as a file locator) to form the e-CLIP.

This asset identification system provides a highly reliable method of verifying that an asset is in fact the asset that matches a given asset content identifier. Verification is not dependent on file name, date, location, or any other such label which may be changed independently of the asset contents. The cryptographic hash function used to generate the asset content identifier can be applied to the contents of the asset (or to information which is believed to be the original asset) at any time and the match between the asset and the asset content identifier can then be verified. The integrity of this approach is based on the strength of the cryptographic hash functions used to create the asset content identifiers. The MD5 algorithm, for example, which is used in a preferred embodiment can be demonstrated to virtually guarantee a unique asset content identifier for any binary sequence, no matter how similar or different it may be to/from another sequence. As such, two assets whose MD5 digests are the same can be assumed to have identical binary sequences (contents) and two assets whose MD5 digests are different can be assumed to have different binary sequences.

Silos are adapted to work with this asset content identification scheme system by first monitoring file requests sent over the network. These requests include an asset content identifier for each file requested (preferably, these file content identifiers have been computed as described above). A silo then adds the asset content identifier of the requested asset to a list of assets that the silo would like to obtain. The silo then obtains these asset from the network either by receiving a broadcast of the asset when it is transmitted by another network device, or by requesting or importing the asset using an importer running on the silo. An importer is a small program encoded preferably in the JAVA programming language, or in any other suitable language.

In the example shown, an e-CLIP sender 202 sends an e-CLIP to a first e-CLIP recipient 212. The e-CLIP contains a descriptor file identifier that uniquely identifies a descriptor file; the descriptor file contains a list of digital assets (files or other binary sequences like database records, video clips, graphic images, audio clips, or other digital data) which the e-CLIP sender wishes to transfer to the first e-CLIP recipient or to store in a silo or on multiple silos for future reference. At this point, e-CLIP recipient 212 does not yet have the descriptor file, only the descriptor file identifier which uniquely identifies the descriptor file. Preferably, the descriptor file identifier is a cryptographic hash of the descriptor file. Upon receiving the e-CLIP (and the included descriptor file identifier), the first e-CLIP recipient sends over the network a broadcast request for the descriptor file by sending the descriptor file identifier provided in the e-CLIP. Once recipient 212 receives the descriptor file, it can begin requesting the assets listed in that list. The broadcast request for the descriptor file is received by both e-CLIP sender 202 and by a silo 222.

Upon receiving the request for the descriptor file, silo 222 determines that it does not already have the descriptor file (i.e., the descriptor file that contains the asset list). It then adds the received descriptor file identifier to its silo request list. The descriptor file identifier is preferably marked with a flag bit indicating that it is an identifier of a descriptor file; thus, the silo automatically adds the descriptor file identifier to its silo request list. In some embodiments, the silo does not add the descriptor file identifier to its silo request list immediately, but instead waits until it sees the descriptor file identifier requested on the network a certain number of times before adding it to the silo request list. This allows the silo to only store commonly requested assets or descriptor files. Assets may be stored only in certain circumstances, too. For example, an asset request may be flagged for priority distribution, or may be for a fundamental asset.

In another example, an asset request may take the form of an e-CLIP that represents required assets using a descriptor file identifier that identifies a descriptor file. A silo may be configured to immediately add all such descriptor file identifiers to its silo request list. When the descriptor file is obtained, the silo then adds the asset content identifiers listed in the descriptor file to its silo request list. In this fashion, a silo is arranged to look for and store the assets that the e-CLIP represents.

It is also important to note that assets may be designated for deletion by broadcasting an asset content identifier for the asset that is to be deleted. In one embodiment, a special file list is broadcast to silos and clients that lists assets that are to be deleted. In such a manner, assets that are redundant, are old, or have been replaced may be eliminated. In some embodiments, flags may be included in a broadcast asset list to identify assets to be deleted. These flags may also identify assets to be deleted only if certain criteria are met, such as whether an asset is not required by any application that is retained in the computer system. In addition, assets may be flagged for deletion at a later time, in a specified order, upon the deletion of another dependent file, or based on other criteria.

Once silo 222 adds the descriptor file identifier to its silo request list, the silo will monitor broadcast network traffic and attempt to add the descriptor file (or the descriptor file that corresponds to the descriptor file identifier) to its storage. Storage in this context is an area of local memory reserved for storing assets in a way optimized for instant retrieval using a cryptographic hash file content identifier. After receiving the e-CLIP and sending a request for the assets identified in the e-CLIP, the first e-CLIP recipient also monitors broadcast traffic to receive the descriptor file if it is sent. The descriptor file is preferably sent when the e-CLIP sender receives the request for the descriptor file (by way of the broadcast descriptor file identifier from recipient 212) and responds to it by broadcasting the descriptor file over the network.

When the descriptor file is broadcast, the silo and the first e-CLIP recipient both receive the descriptor file. As discussed above, the descriptor file is a list of asset content identifiers, each uniquely identifying a desired file or other digital asset. The silo knows to store the descriptor file because the descriptor file matches the descriptor file identifier previously seen by the silo and added to its silo request list. In other words, the silo may recompute the cryptographic hash function for the received descriptor file to produce a new descriptor file identifier. If this new identifier is the same as the original descriptor file identifier then there is positive verification.

As noted above, silos may add all identifiers to their silo request lists or may add only identifiers according to some specified criteria. Criteria may include the number of requests seen for the asset, a priority flag, order in which received, and the identity of the client requesting the asset. The silo then determines whether to add the individual assets from the list to its silo request list according to whichever scheme is being used. For the purpose of this example, it will be assumed that silo 222 is configured to immediately add at least some of the assets from the received file list to its silo request list. Thus, the asset content identifiers for these assets are added to the silo request list.

After receiving the descriptor file containing asset content identifiers, first e-CLIP recipient 212 broadcasts a request over the network for the assets in the descriptor file by broadcasting the asset content identifiers. The request for assets in the file list is received by both the silo and the e-CLIP sender. Upon receiving the request for the assets in the descriptor file, the silo can respond to the request if it has stored the assets or parts of the assets. A process for determining whether the silo responds to an asset request is detailed below in FIG. 7.

Assuming for this example that the silo does not have any of the assets requested by the first e-CLIP recipient, the silo would not be able to respond to the request. By monitoring broadcast traffic, the e-CLIP sender can determine that the request was not answered by a silo. The e-CLIP sender then determines that it should itself respond to the request in order for assets to be transferred to the first e-CLIP recipient. Assuming that it has the assets, the e-CLIP sender then broadcasts the assets and the assets are received by both the silo and the e-CLIP recipient. The silo then adds those asset to its storage that are included on the silo request list.

It is advantageous to have the silo intercept the requested descriptor file, add the assets in the descriptor file to its silo request list, and then store those assets in memory when those assets are broadcast over the network by a sender. In particular, it is advantageous when the e-CLIP sender (which may be a remote system not on the local network) decides to send the same e-CLIP to a second e-CLIP recipient. When e-CLIP sender 202 sends the same e-CLIP to a second e-CLIP recipient 232, the second e-CLIP recipient broadcasts a request over the network using the descriptor file identifier identified in the e-CLIP. This is a request for the descriptor file uniquely identified by the descriptor file identifier.

Silo 222 receives this request as does e-CLIP sender 202. The silo has already stored the descriptor file corresponding to the descriptor file identifier; thus, the silo can respond to the second e-CLIP recipient with the descriptor file. The e-CLIP sender sees that the silo has responded to the request, thus the e-CLIP sender need not respond. Upon receiving the descriptor file, the second e-CLIP recipient then proceeds to request the assets on the descriptor file's list by again broadcasting over the network the asset content identifiers from the descriptor file. Both the silo and the e-CLIP sender receive the request; the silo is able to respond to the request for those assets because the silo had previously intercepted and stored those assets when they were sent from the e-CLIP sender to the first e-CLIP recipient.

Because silo 222 responds to the request for assets, e-CLIP sender 202 need not respond to the request by sending assets to the second e-CLIP recipient. In fact, it is possible that the e-CLIP sender might have deleted some of the assets from its data storage and may not even have the asset locally available when the e-CLIP is sent to the second e-CLIP recipient. Or, the E-CLIP sender may be engaged sending to thousands of machines the same data. By simply having the descriptor file identifier and knowing that it corresponds to the assets that the e-CLIP sender would like to send to the second e-CLIP recipient, the e-CLIP sender can transfer those assets, so long as they are located somewhere on a silo in the network. This arrangement relieves the e-CLIP sender from having to permanently store all the assets it needs to send, and from having to send those assets itself. It also provides more efficient local delivery of the requested data. Data may come from a silo, from prior e-CLIP recipients whose download is already completed, from the local network, or from another more efficient source.

Using this scheme, data is stored and made available to clients on the network that require data without requiring all clients to access a particular server that has the data. Neither is it required that data be selected and stored on a particular server according to a prearranged plan for making that data available. Nor is it required for the address of a particular server to be made known so that clients may access the server. Instead, silos on the network monitor data sent across the network and determine which data should be stored in a silo, thus making the data readily available to clients on the network. The scheme described provides a true serverless network with distributed data storage. As will be described below, silos may be added for storage either serially or in parallel. Because unique identifiers such as cryptographic hash file identifiers are used, a digital asset may be obtained from any location where it has been stored and the integrity of the contents may be verified without the danger of obtaining an incorrect version of an asset.

Figure 3:
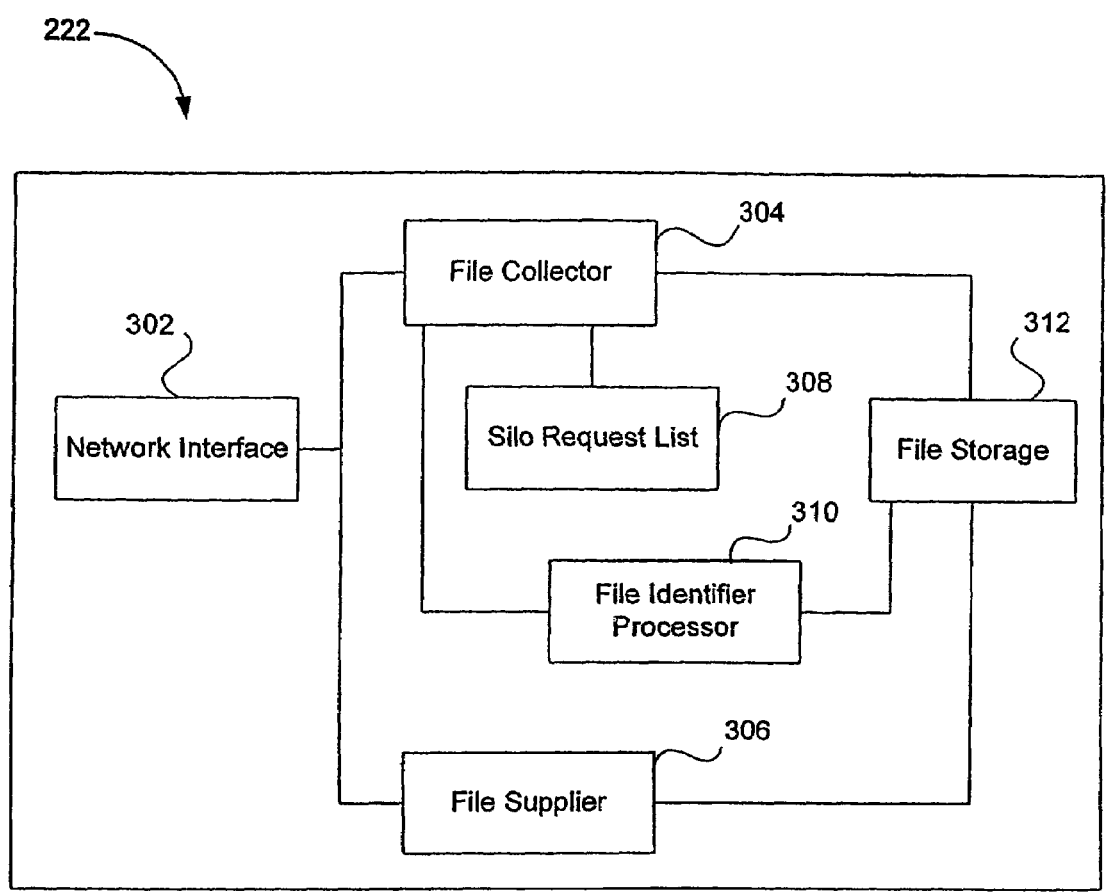
FIG. 3 is a block diagram of the silo of FIG. 2 configured to receive asset content identifiers broadcast over a network, to obtain identified assets, and to provide assets in response to asset requests from devices on the network.

FIG. 3 is a block diagram of silo 222 configured to receive asset content identifiers broadcast over the network, to obtain the identified assets, and to provide those assets in response to requests from devices on the network. Silo 222 includes a network interface 302 that is connected to the network and that can receive and send broadcasts or point-to-point messages over the network. Network interface 302 is connected to an asset collector 304 and an asset supplier 306. The asset collector functions to receive data or parts of assets over the network and to determine when those assets should be transferred to storage. In addition, the asset collector may determine when to request assets which are needed. Asset collector 304 is described in more detail in FIGS. 6 and 7.

Asset supplier 306 keeps track of assets that are included in storage 312 and determines when those assets should be received over the network in response to an asset request. Asset supplier 306 is described in more detail in FIG. 8. Asset collector 304 uses a desired list of cryptographic hash descriptor asset identifiers that is a silo request list 308. The silo request list is a list stored in memory of assets that should be collected or obtained. The silo request list includes asset identifiers received over the network by the silo that the silo has determined correspond to assets that should be obtained. An asset identifier processor 310 is used to generate asset identifiers for assets obtained by asset collector 304 and stored in asset storage 312. The purpose of processor 310 is to verify that the assets obtained from the network match the asset identifier from the silo request list. Assets may be quarantined by asset identifier processor 310 prior to placing them in asset storage. That is, processor 310 may require that an asset identifier for an obtained asset be verified before placing the entire asset in asset storage or before providing the asset to a requester on the network. Asset collector 304 uses asset identifier processor 310 to determine when an asset has been verifiably received and when that asset should be removed from the silo request list.

Parallel and Serial Silos

Multiple silos on a network may be configured in parallel so that different silos store the same information. Thus, when an asset is requested by a client, that information may be provided by any of the silos which happen to have the asset. In one embodiment, the silo that responds to a request is selected simply by allowing the silo which is able to respond first be the one that responds to the asset request. In this manner, the silo that can most quickly give the information is allowed to do so; when other silos that also have the information see that the request has been responded to, they need not respond. In this embodiment, the silo that responds first is allowed to fulfil the asset request. The silo might respond first because it is the closest, because it is least loaded with requests at the time, or because of some other reason. In other embodiments, other ways of balancing loads between parallel silos may be used. For example, silos may have a hierarchical structure where certain silos are given the opportunity to respond within a certain period of time; after that time expires, other silos are allowed to respond. The parallel silo scheme lends itself to a large amount of flexibility in determining which silo responds to a given request and how much redundancy of stored information is provided.

Silos may also be configured in a serial manner. In one embodiment, this is done by simply implementing a selection rule for the asset identifiers that a given silo may add to its silo request list. For example, the number that represents the asset identifier for a particular asset could simply be divided modulo the number of silos available. The remainder after the modulus operation is noted. Each silo (or group of silos) would add only those assets to its silo request list whose asset list identifiers leave a certain remainder.

For example, consider four silos connected serially. One silo is assigned to store assets whose asset identifiers compute to a remainder of 0 modulo 4, another silo is assigned to store assets whose asset identifiers compute to a remainder of 1 modulo 4, one silo is assigned to store assets whose asset identifiers compute to a remainder of 2 modulo 4, and the last silo is assigned to store assets whose asset identifiers compute to a remainder of 3 modulo 4.

In the embodiment described, since the asset identifiers are determined by the cryptographic hash function, the remainders that correspond to each of the asset identifiers should be evenly distributed. In addition, it is possible to assign more than one remainder to a given silo or a group of parallel silos, thus, a silo with a large capacity can be configured to store a greater proportion of assets than a smaller silo.

Obtaining Assets on the Silo Request List

Once asset identifiers are added to a silo's request list, the silo may obtain the assets either actively or passively. To obtain the assets passively, the silo simply monitors network traffic for file segments that correspond to a descriptor file identifier that is on the silo request list. When such a segment is received, the silo stores the segment in BLOB storage and notes that it has been received. In active mode, the silo cycles through the silo request list and requests assets from the network that have not yet been received. For example, consider an asset identifier added at the bottom of the silo request list. While other assets above it are being requested, most or all of that bottom asset may be received passively as a result of a request from another network device. If the entire asset is received and the asset identifier is verified, then that asset identifier may be removed from the silo request list before it reaches the top. Alternatively, the asset identifier may reach the top of the silo request list and the silo may request all of the asset or just the parts of the asset that have not yet been received.

The rate or number of active requests made by the silo may be adjusted according to the amount of broadcast traffic observed on the network. Thus, the amount of bandwidth budgeted for silos to perform their asset collecting and archiving function may be adjusted so that performance for other traffic on the network is not degraded. Thus, each silo may check the level of broadcast traffic before it begins sending broadcast requests for assets or asset segments. If the network is particularly busy, then silos may hold their requests until the network becomes less busy. Thus, silos may perform their archiving tasks in an unobtrusive manner as network bandwidth becomes available. In addition, as mentioned before, the time that a silo waits before responding to a broadcast asset request may also be adjusted. A silo may respond only after other silos have failed to respond, or may wait in order to limit the amount of broadcast network bandwidth used by the silos.

Data Structures

Figure 4:
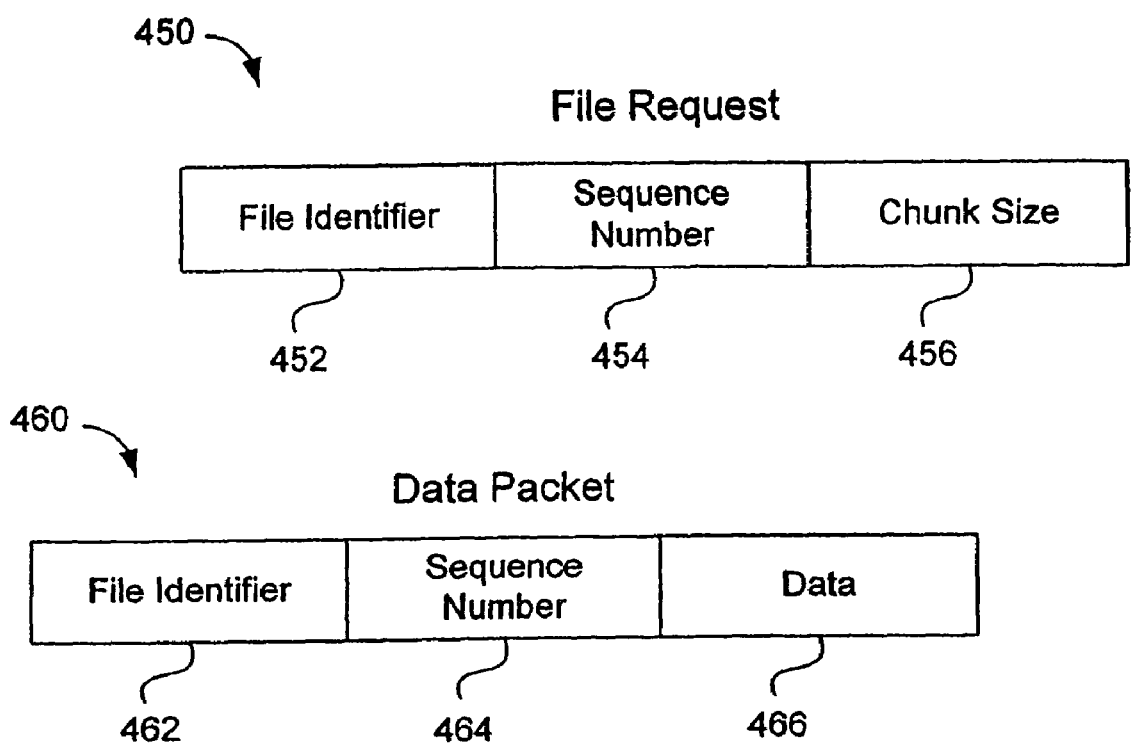
FIG. 4 is a block diagram of the structure of an asset request generated by a silo and the structure of a data packet that contains a segment of asset data.

Certain data structures are defined for the purpose of facilitating silos requesting and providing assets. FIG. 4 is a block diagram illustrating the structure of an asset request generated by a silo to obtain part of a missing asset. A request 450 includes an asset identifier 452, a sequence number 454, and a chunk size 456. The asset identifier is obtained from the descriptor file. The sequence numbers are generated by the importer based on the size of the asset segments that it will request. The asset segment size is specified by the importer in certain embodiments. It should be noted that in other embodiments the segment size is specified by the system and is not changeable by individual importers. A data packet 460 that carries a segment includes an asset identifier 462, a sequence number 464, and data 466 which represents the asset segment. The length of the data corresponds to the length of the segment size specified in request 450. Thus, incoming asset segments can be ordered according to their sequence number and the data in the asset can be recovered from the ordered segments once all of the asset segments have been received.

FIG. 5 is a diagram illustrating the structure of a descriptor file 400. The particular descriptor file shown uses a "hyperfile" modeling language (HFML) to describe the structure of the directories containing assets as well as the assets themselves. A HFML is described in the provisional patent application referenced above. The syntax of the modeling language used in discussions of this invention are derived from the specifications for the eXtensible Markup Language (XML), standardized by the World Wide Web Consortium (W3C) and the Internet Engineering Task-Force (IETF) to adopt a generally accepted standard. In general, it should be noted that implementation of an e-CLIP is not restricted to a descriptor file written in this syntax. An HFML derived from XML is preferably used because it is readily parsed and can be used to generate a tree-structured directory of the assets and keys contained in the descriptor file.

The first item in descriptor file 400 is a folder 402. A folder name 404 as well as a time stamp 406 is included in folder 402. Folder 402 matches up with an end folder tag 408 that marks the end of folder 402. Nested inside of folder 402 is a first nested folder 412. Folder 412 includes a folder name 414 and a time stamp 416. A file 422 is included inside of folder 412. File 422 includes a file name 424, a time and date stamp 426, a size 428, and a cryptographic hash asset identifier 430 generated by the MDS algorithm and represented as a 27-character string. Likewise, folder 412 also includes a file 432. File 432 includes a file name 434, a time and date stamp 436, a size 438, and a cryptographic hash asset identifier 440. Folder 412 matches with an end folder tag 419.

It should be evident that an arbitrary number of folders can thus be represented and nested within other folders as desired, so that an arbitrary tree-shaped directory can be specified with an arbitrary number of files specified in each of the folders of the directory. In other words, the cryptographic hash descriptor asset identifier of the descriptor file functions as a "key to a box of keys." Each of the keys within the box may itself be a key to yet another box of keys. Each of the assets may include a file name and meta data as desired plus a cryptographic hash asset identifier that uniquely identifies the asset based on the content of the asset. In some embodiments, the cryptographic hash asset identifier is the only identifier for the asset; in other embodiments a conventional file name is also associated with the asset (if appropriate).

Thus, it will be appreciated that when the descriptor file specified by an e-CLIP is recovered (for example, after a computer crash), complete file name and directory information for files that are specified by the e-CLIP is obtained. One technique of using an e-CLIP is described in U.S. patent application Ser. No. 09/236,366 referenced above.

Flow Diagrams

Figure 6:
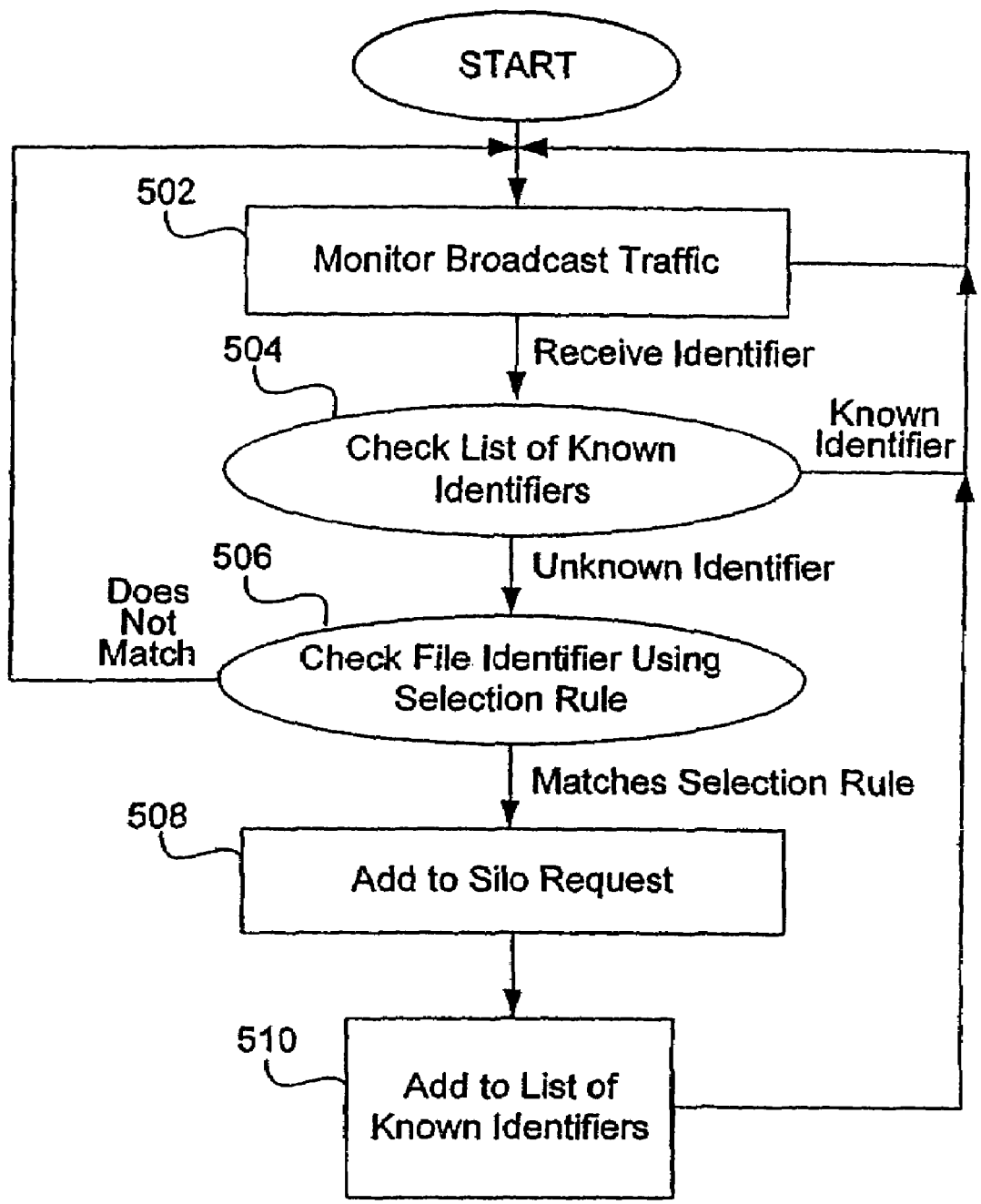
FIG. 6 is a flow chart illustrating a process running on an asset collector of a silo for monitoring the network and for collecting asset identifiers to be stored.

FIG. 6 is a process flow diagram illustrating a process running on asset collector 304 in silo 222 for monitoring the network and collecting asset identifiers that should be stored. In step 502 the silo enters a state where it monitors broadcast traffic. When an asset identifier is received, control is transferred to step 504 and the asset collector checks a list of known identifiers to determine whether or not the asset identifier has already been seen. If the identifier is a known identifier, then control is transferred back to step 502 and the asset collector continues to monitor broadcast traffic. If the identifier is not a known identifier, then control is transferred to step 506 and the asset collector checks the file identifier using its selection rule (if the silos are serially configured). Alternatively, steps 504 and 506 may also be performed in reverse order.

If the asset identifier matches the selection rule in step 506, then control is transferred to step 508 and the asset identifier is added to the silo request list. After the asset identifier is added to the silo request list and the asset identifier is added to the List of Known Identifiers in step 510, the asset collector begins collecting segments of the asset as those segments are received over the network. If, however, the asset does not match the selection rule in step 506 then control is transferred back to step 502. In this fashion, a silo automatically collects asset that are transmitted over the network.

In embodiments where silos are not connected in series then a selection rule might not be used. In this case, step 506 may either be skipped or the selection rule may simply be defined as selecting all asset identifiers that are in the correct form. In addition, it should be noted that in some embodiments, assets are not added to the silo request list unless they have been seen a certain number of times. In such instances, a count of the number of times that an asset identifier has been seen is maintained, and an extra step is used to determine whether the number of times that the asset has been seen exceeds a defined number of times. In some embodiments all asset list identifiers that represent descriptor assets are automatically added to a silo request list regardless of any criteria such as a selection rule or a number of times that an asset identifier should be seen. The purpose of always adding such descriptor file identifiers is to be able to determine which assets are included in the descriptor file so that the nested assets represented within it may be added to the silo request list if appropriate.

In addition to monitoring the network and determining the asset identifiers that should be added to its silo request list, file collector 304 also monitors network traffic to obtain files identified by the asset identifiers in its silo request list.

Figure 7:
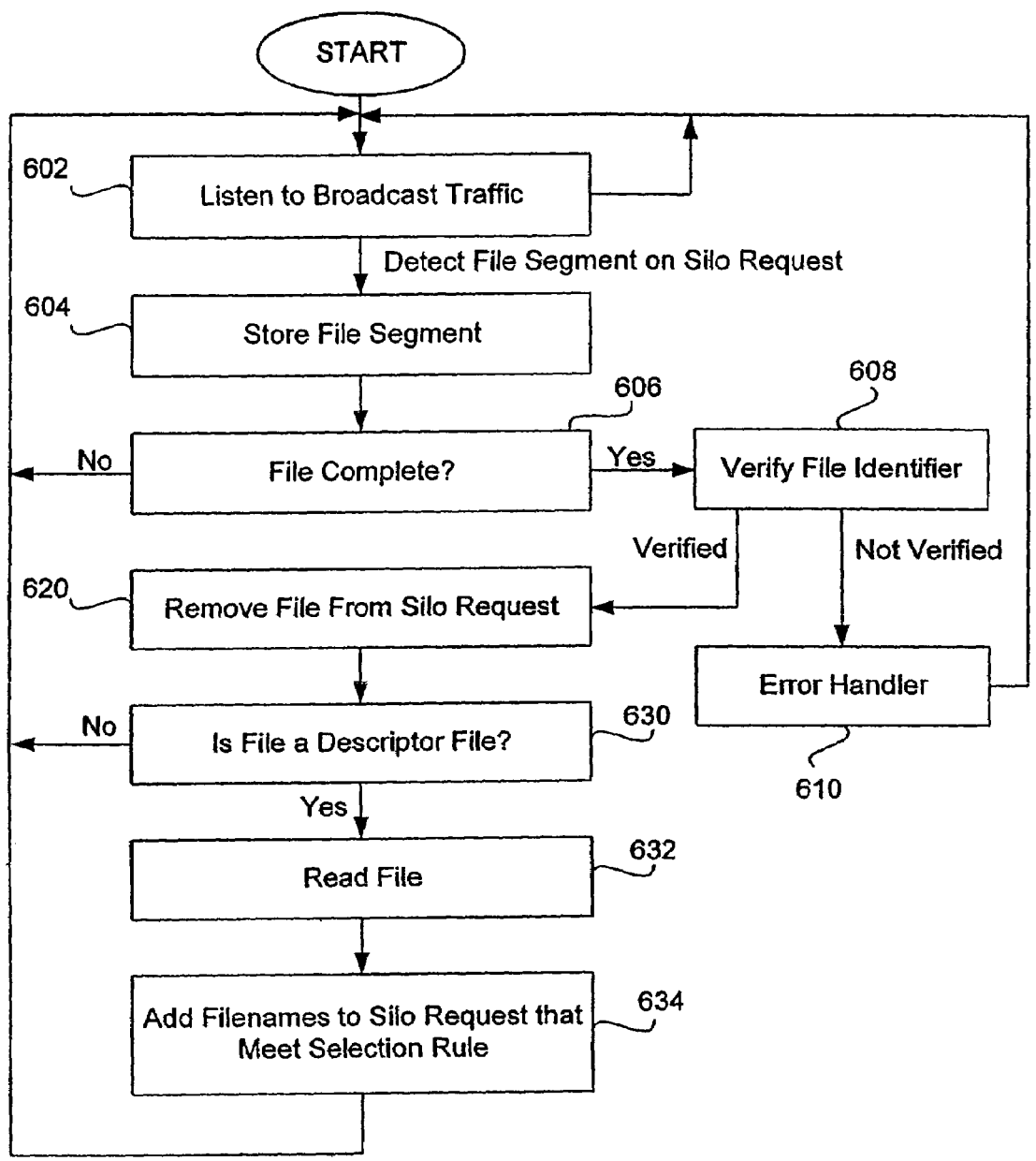
FIG. 7 is a flow chart illustrating a process for retrieving an asset from the network implemented by an asset collector of a silo.

FIG. 7 is a flow chart illustrating a process for retrieving an asset from the network implemented by asset collector 304. In step 602 the asset collector enters a state of listening to broadcast traffic on the network. When an asset segment is detected that corresponds to an asset identifier on the silo request list, control is transferred to step 604 and the asset segment is stored.

In step 606 it is determined whether the asset corresponding to the asset segment is complete. If it is not complete, then the asset collector resumes listening to broadcast traffic. If the asset is complete, then control is transferred to step 608 and it is verified that the asset identifier corresponds to a cryptographic hash of the asset If the asset identifier is not verified, then control is transferred to an error handler in step 610. If the asset identifier is verified, then control is transferred to step 620 aid the asset identifier is removed from the silo request list. It should be noted that in some embodiments, it is determined before step 604 whether the asset segment has been seen before storing it. In other embodiments, the asset segment is simply stored and overwrites any asset segments that had been previously received and stored.

Next, in step 630 the file collector checks whether the file is a descriptor file. If the file is a descriptor file, then control is transferred to step 632 and the file is read. If the file is not a descriptor file, then the asset collector continues to monitor broadcast traffic. After the descriptor file is read in step 632, control is transferred to step 634 and the file names within the descriptor file are added to the silo request list if those files meet the selection rule implemented on the silo.

Thus, the process shown in FIG. 7 enables file collector 304 to get asset segments from the network that correspond to asset identified by asset identifiers on its silo request list. Once the asset is assembled segment by segment to include all of the segments of the asset, then the asset identifier is checked. Once the asset identifier is checked, there is a high degree of confidence that the asset has been received intact and the asset can then be removed from the silo request list. In addition, as noted above, the asset collector is continually cycling through its silo request list and checking whether there are assets in the silo request list that should be requested.

The determination that an asset should be requested can be made in a number of ways. In one embodiment, the determination is made when the asset has been on the silo request list a certain period of time. This determination may be affected by the amount of broadcast traffic on the network. That is, if broadcast traffic is low and bandwidth is readily, available, the asset collector may broadcast requests for assets on the silo request list after a very short period of time or simply when those assets come to the top of the silo request list. When broadcast traffic on the network is heavy, the asset collector may hold off from broadcasting requests for assets until more bandwidth is available. Also, the asset collector may adjust the rate or number of its broadcast requests according to the amount of broadcast traffic detected. Once the asset collector has placed a verified asset in file storage 312, asset supplier 306 can respond to requests for the asset over the network.

Figure 8:
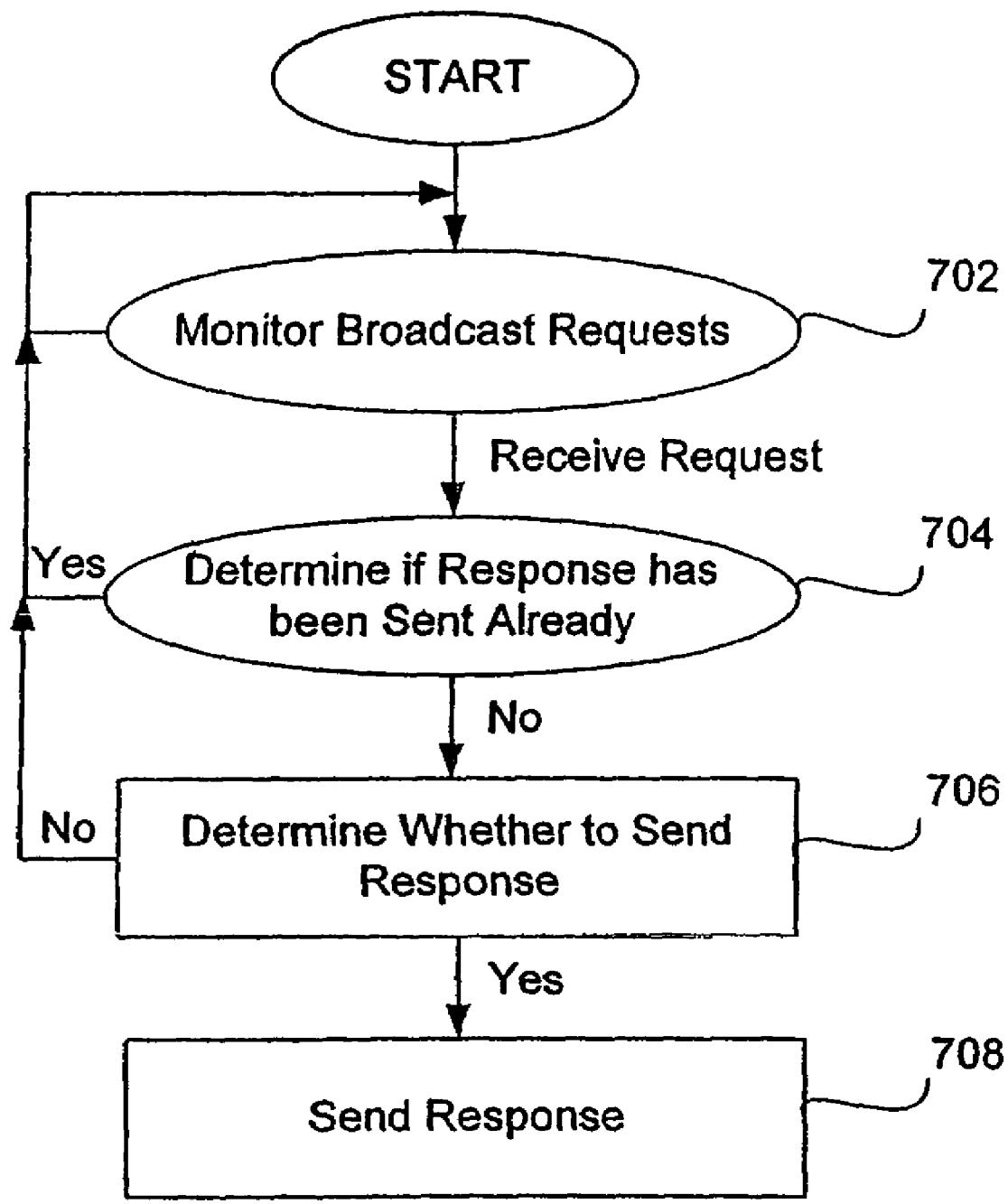
FIG. 8 is a flow chart illustrating a process implemented on an asset supplier of a silo for determining whether to send a response and for sending the response.

FIG. 8 is a flow chart illustrating a process implemented on asset supplier 306 for determining whether to send a response and for sending a response. In step 702 the asset supplier enters a state of monitoring broadcasts for assets over the network. When a request for an asset is received, control is transferred to step 704 and the asset supplier determines if a response to the request has already been sent. If a response has already been sent, then the asset supplier resumes monitoring broadcast requests. If a response has not already been sent on the network by another source, then control is transferred to step 706 where the asset supplier determines whether to send a response.

The determination of whether to send a response may include a number of factors. A response should only be sent if at least part of the asset has been received by the silo. In some embodiments, silos send segments of assets that they have received regardless of whether they have received the whole asset or have verified the asset identifier. More preferably, silos only send responses to requests for which they have obtained the entire asset and have verified the contents of the asset. Also, a silo connected in parallel with other silos (or a backup silo) may have a specified delayed time to wait before beginning to send a response to an asset request, thus allowing another silo the first opportunity to send the asset. Other factors such as the identity of the requesting machine or the network of the requesting machine may be considered in determining whether to send a response. If it is determined to send a response, then in step 708 the asset requested is sent by asset supplier 306 to the requesting entity.

As described above, several silos may respond to an asset request and the first silo to respond may be chosen as the one to actually provide the data; the other silos defer to the first silo when they see its response. In another embodiment that uses multiple silos, silos do not initially respond to asset requests by sending the asset. Instead, silos send a bid. The bid includes the identity of the silo as well as information that relates to the silo's ability or suitability to respond to the request. For example, the silo's speed, cost of information, current load, etc., may be sent. Then, an agent selects the best silo to use and directs a specific request to that silo. In this manner, a market is set up for providing information and the best silo is selected.

Thus, it has been shown how a group of silos may be included on a network to provide assets requested by network devices or clients on the network. The silos may be connected in series so that silos respond only to certain requests, or may be connected in parallel so that any silo can respond to any request. In addition, the asset collecting function of the silos may be adjusted so that silos do not use an excessive amount of network bandwidth to collect the assets that they are to provide. The amount of bandwidth taken by the silos may be adjusted according to a detected amount of network traffic. This may be done by obtaining information from a network, from an enterprise management system or from network hardware used in the system. In this manner, a distributed architecture for automatic asset storage and retrieval has been disclosed.

Computer System Embodiment

Figure 9:
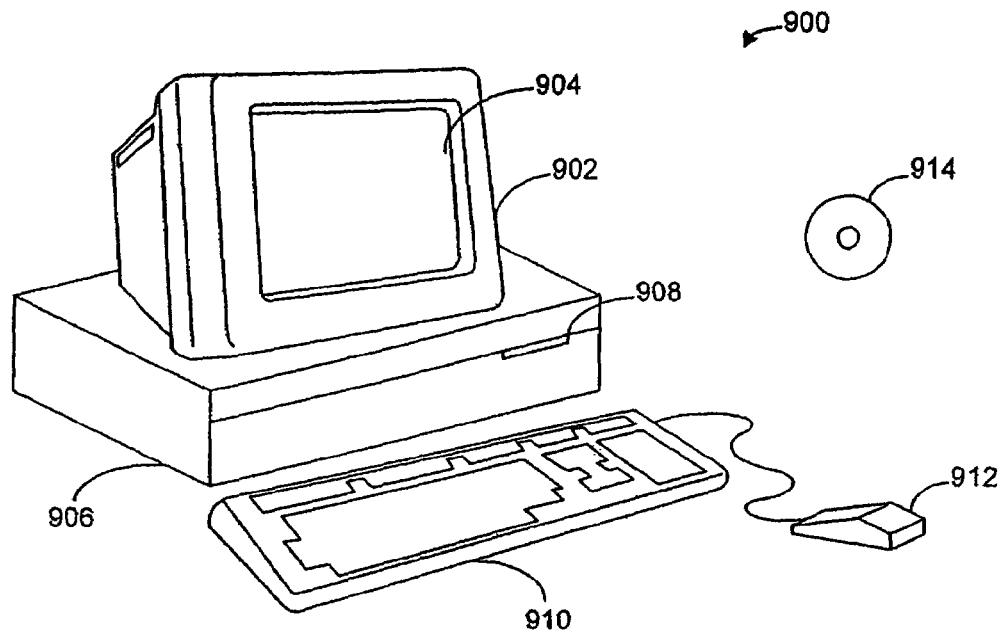
FIGS. 9 and 10 illustrate a computer system 900 suitable for implementing embodiments of the present invention.
Figure 10:
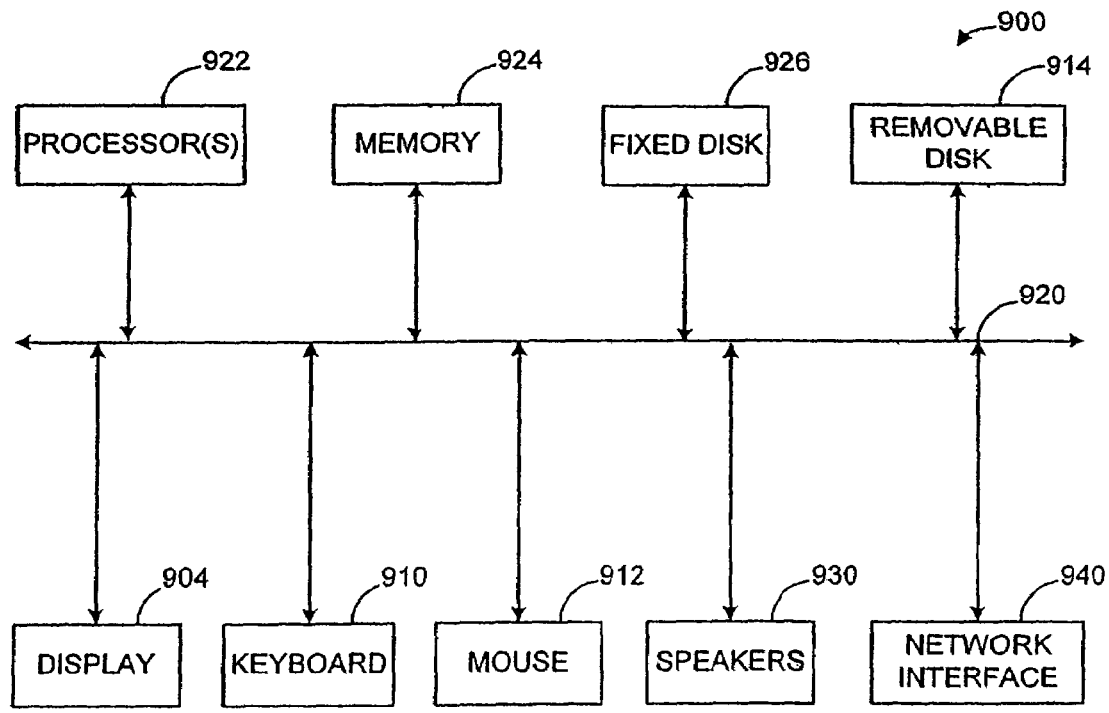

FIGS. 9 and 10 illustrate a computer system 900 suitable for implementing embodiments of the present invention. FIG. 9 shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 10 is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bidirectional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. For example, any number of silos may be present on a network and may be configured in different ways. A silo may be implemented on any suitable computing device. An e-CLIP may be used to transmit a unique representation of an asset or of a list of assets, or any other suitably unique identifier may be used. A recipient or client on a network may also function as a silo. A silo may be implemented in many ways, and not necessarily exactly as described. The implementation of a silo request list and its priority of assets can be performed in different ways. A descriptor file may take other forms than that shown, and may include solely asset identifiers, or may also include meta data. Accordingly, the present embodiments are to be considered as illustrative and not restrictive, and the invention is not to be limited to the details given herein, but may be modified within the scope and equivalents of the appended claims.

The invention claimed is:

1. A method of managing a computer system comprising a plurality of nodes connected via at least one communication medium, the computer system storing a plurality of digital assets, wherein at least one of the plurality of digital assets comprises content and is identified in the computer system via an identifier that is based, at least in part, on at least some of the content of the at least one of the plurality of digital assets, the plurality of nodes comprising at least a first node and a second node, wherein the identifier is the only identifier that can be used to identify the at least one of the plurality of digital assets in any communication between the first node and the second node, the method comprising acts of: (A) storing each of the plurality of digital assets via at least one of the plurality of nodes according to a distribution scheme that provides distributed storage of the plurality of digital assets among the plurality of nodes; and (B) in response to a request to access at least one of the plurality of digital assets; (B1) performing a determination via the first node to determine whether the first node stores the at least one of the plurality of digital assets; and (B2) performing a determination via the second node to determine whether the second node stores the at least one of the plurality of digital assets.

2. The method of claim 1, wherein the at least one communication medium comprises at least one network.

3. The method of claim 1, wherein at least one of the plurality of nodes comprises a silo that manages storage of at least some of the plurality of digital assets.

4. The method of claim 1, wherein the computer system comprises a content addressable storage system.

5. The method of claim 1, wherein the computer system comprises a storage system.

6. The method of claim 1, wherein the plurality of nodes are peer computers that are coupled by the at least one communication medium.

7. The method of claim 1, wherein the act (A) comprises storing at least one of the plurality of digital assets on at least one of the plurality of nodes.

8. The method of claim 1, wherein the act (A) comprises storing at least one of the plurality of digital assets on a storage device managed by at least one of the plurality of nodes.

9. The method of claim 1, wherein the act (A) comprises an act of storing each of the plurality of digital assets according to a distribution scheme enabling at least one of the plurality of digital assets to be stored in a manner that is not prearranged and is dependent upon at least one performance parameter of the computer system.

10. The method of claim 1, further comprising an act of: (C) managing the distribution of the plurality of digital assets among the plurality of nodes, at least in part, via node-to-node communications among the plurality of nodes.

11. The method of claim 1, wherein the act (A) comprises an act of storing each of the plurality of digital assets on at least one of the plurality of nodes according to a distribution scheme that evaluates at least one performance parameter of the computer system in determining on which of the plurality of nodes to store at least one of the plurality of assets.

12. The method of claim 1, wherein the act (A) comprises an act of storing at least one of the plurality of digital assets on two or more of the plurality of nodes in accordance with the distribution scheme.

13. The method of claim 1, wherein the request is initiated from one of the plurality of nodes.

14. The method of claim 1, wherein the determinations performed in acts (B1) and (B2) are performed in parallel.

15. The method of claim 1, wherein the determinations performed in acts (B1) and (B2) are performed serially.

16. The method of claim 1, wherein the determinations performed in acts (B1) and (B2) are performed using the identifier for the at least one of the plurality of digital assets.

17. The method of claim 1, wherein the act (B) comprises an act of determining that both the first node and the second node store the at least one of the plurality of assets.

18. The method of claim 1, wherein the act (B) comprises an act of determining that the first node stores the at least one of the plurality of assets, and wherein the method further comprises an act of: (C) responding to the request by providing the at least one of the plurality of assets from the first node.

19. At least one computer readable medium encoded with a plurality of instructions for execution on a computer system, the computer system comprising a plurality of nodes connected via at least one communication medium, the computer system storing a plurality of digital assets, wherein at least one of the plurality of digital assets comprises content and is identified in the computer system via an identifier that is based, at least in part, on at least some of the content of the at least one of the plurality of digital assets, the plurality of nodes comprising at least a first node and a second node, wherein the identifier is the only identifier that can be used to identify the at least one of the plurality of digital assets in any communication between the first node and the second node, the plurality of instructions, when executed on the computer system, performing a method comprising acts of: (A) storing each of the plurality of digital assets via at least one of the plurality of nodes according to a distribution scheme that provides distributed storage of the plurality of digital assets among the plurality of nodes; and (B) in response to a request to access at least one of the plurality of digital assets; (B1)

performing a determination via the first node to determine whether the first node stores the at least one of the plurality of digital assets; and (B2) performing a determination via the second node to determine whether the second node stores the at least one of the plurality of digital assets.

20. The at least one computer readable medium of claim 19, wherein the at least one communication medium comprises at least one network.

21. The at least one computer readable medium of claim 19, wherein at least one of the plurality of nodes comprises a silo that manages storage of at least some of the plurality of digital assets.

22. The at least one computer readable medium of claim 19, wherein the computer system comprises a content addressable storage system.

23. The at least one computer readable medium of claim 19, wherein the computer system comprises a storage system.

24. The at least one computer readable medium of claim 19, wherein the plurality of nodes are peer computers that are coupled by the at least one communication medium.

25. The at least one computer readable medium of claim 19, wherein the act (A) comprises storing at least one of the plurality of digital assets on at least one of the plurality of nodes.

26. The at least one computer readable medium of claim 19, wherein the act (A) comprises storing at least one of the plurality of digital assets on a storage device managed by at least one of the plurality of nodes.

27. The at least one computer readable medium of claim 19, wherein the act (A) comprises an act of storing each of the plurality of digital assets according to a distribution scheme enabling at least one of the plurality of digital assets to be stored in a manner that is not prearranged and is dependent upon at least one performance parameter of the computer system.

28. The at least one computer readable medium of claim 19, wherein the method further comprises an act of: (C) managing the distribution of the plurality of digital assets among the plurality of nodes, at least in part, via node-to-node communications among the plurality of nodes.

29. The at least one computer readable medium of claim 19, wherein the act (A) comprises an act of storing each of the plurality of digital assets on at least one of the plurality of nodes according to a distribution scheme that evaluates at least one performance parameter of the computer system in determining on which of the plurality of nodes to store at least one of the plurality of assets.

30. The at least one computer readable medium of claim 19, wherein the act (A) comprises an act of storing at least one of the plurality of digital assets on two or more of the plurality of nodes in accordance with the distribution scheme.

31. The at least one computer readable medium of claim 19, wherein the request is initiated from one of the plurality of nodes.

32. The at least one computer readable medium of claim 19, wherein the determinations performed in acts (B1) and (B2) are performed in parallel.

33. The at least one computer readable medium of claim 19, wherein the determinations performed in acts (B1) and (B2) are performed serially.

34. The at least one computer readable medium of claim 19, wherein the determinations performed in acts (B1) and (B2) are performed using the identifier for the at least one of the plurality of digital assets.

35. The at least one computer readable medium of claim 19, wherein the act (B) comprises an act of determining that both the first node and the second node store the at least one of the plurality of assets.

36. The at least one computer readable medium of claim 19, wherein the act (B) comprises an act of determining that the first node stores the at least one of the plurality of assets, and wherein the method further comprises an act of: (C) responding to the request by providing the at least one of the plurality of assets from the first node.

37. A computer system for storing a plurality of digital assets, the computer system comprising: a plurality of nodes comprising at least a first node and a second node; at least one communication medium that couples the plurality of nodes; and at least one processor programmed to store each of the plurality of digital assets via at least one of the plurality of nodes according to a distribution scheme that provides distributed storage of the plurality of digital assets among the plurality of nodes, the plurality of digital assets comprising at least one first digital asset which is identified by the at least one processor via a first identifier that is based, at least in part, on at least some of the content of the at least one first digital asset, and at least one second digital asset which comprises the first identifier and metadata relating to the at least one first digital asset, the at least one second digital asset being identified by the at least one processor via a second identifier that is based, at least in part, on the content of the at least one second digital asset, the at least one processor being programmed to, in response to a request to access at least one of the plurality of digital assets; perform a determination via the first node to determine whether the first node stores the at least one of the plurality of digital assets; and perform a determination via the second node to determine whether the second node stores the at least one of the plurality of digital assets.

38. The computer of claim 37, wherein the at least one communication medium comprises at least one network.

39. The computer of claim 37, wherein at least one of the plurality of nodes comprises a silo that manages storage of at least some of the plurality of digital assets.

40. The computer of claim 37, wherein the computer system comprises a content addressable storage system.

41. The computer of claim 37, wherein the computer system comprises a storage system.

42. The computer of claim 37, wherein the computer system makes the plurality of digital assets available to at least one client, wherein at least one of the plurality of digital assets comprises content and is identified by the at least one client and the computer system via the first identifier.

43. The computer of claim 42, wherein the at least one processor is programmed to determine whether the first node stores the at least one of the plurality of digital assets and to determine whether the second node stores the at least one of the plurality of digital assets using the first identifier for the at least one of the plurality of digital assets.

44. The computer of claim 37, wherein the plurality of nodes are peer computers that are coupled by the at least one communication medium.

45. The computer of claim 37, wherein the at least one processor is programmed to store at least one of the plurality of digital assets on at least one of the plurality of nodes.

46. The computer of claim 37, wherein the at least one processor is programmed to store at least one of the plurality of digital assets on a storage device managed by at least one of the plurality of nodes.

47. The computer of claim 37, wherein the at least one processor is programmed to store each of the plurality of digital assets according to a distribution scheme enabling at least one of the plurality of digital assets to be stored in a manner that is not prearranged and is dependent upon at least one performance parameter of the computer system.

48. The computer of claim 37, wherein the at least one processor is programmed to manage the distribution of the plurality of digital assets among the plurality of nodes, at least in part, via node-to-node communications among the plurality of nodes.

49. The computer of claim 37, wherein the at least one processor is programmed to store each of the plurality of digital assets on at least one of the plurality of nodes according to a distribution scheme that evaluates at least one performance parameter of the computer system in determining on which of the plurality of nodes to store at least one of the plurality of assets.

50. The computer of claim 37, wherein the at least one processor is programmed to store at least one of the plurality of digital assets on two or more of the plurality of nodes in accordance with the distribution scheme.

51. The computer of claim 37, wherein the request is initiated from one of the plurality of nodes.

52. The computer of claim 37, wherein the at least one processor is programmed to determine whether the first node stores the at least one of the plurality of digital assets and to determine whether the second node stores the at least one of the plurality of digital assets in parallel.

53. The computer of claim 37, wherein the at least one processor is programmed to determine whether the first node stores the at least one of the plurality of digital assets and to determine whether the second node stores the at least one of the plurality of digital assets serially.

54. The computer of claim 37, wherein the at least one processor is programmed to determine that both the first node and the second node store the at least one of the plurality of assets.

55. The computer of claim 37, wherein the at least one processor is programmed to determine that the first node stores the at least one of the plurality of assets and to respond to the request by providing the at least one of the plurality of assets from the first node.

56. The computer system of claim 37, wherein the at least one processor is disposed on at least one of the plurality of nodes.

57. The computer system of claim 37, wherein the at least one processor comprises a plurality of processors distributed among the plurality of nodes.

* * * * *